United States Patent
Bowe et al.

(10) Patent No.: US 6,362,301 B1
(45) Date of Patent: Mar. 26, 2002

(54) CURABLE COMPOSITION

(75) Inventors: Michael Damian Bowe, Doylestown; Linda Louise Graham, Flourtown; Gary David Greenblatt, Rydal; Barry Clifford Lange, Lansdale; Richard Foster Merritt, Ft. Washington, all of PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/418,937

(22) Filed: Oct. 15, 1999

Related U.S. Application Data

(63) Continuation-in-part of application No. 09/212,038, filed on Dec. 15, 1998, which is a continuation-in-part of application No. 09/034,924, filed on Mar. 5, 1998, now abandoned, which is a continuation of application No. 08/467,685, filed on Jun. 5, 1995, now abandoned, which is a division of application No. 08/258,300, filed on Jun. 13, 1994, now abandoned, which is a continuation-in-part of application No. 09/047,547, filed on Mar. 25, 1998.

(60) Provisional application No. 60/077,059, filed on Mar. 6, 1998, and provisional application No. 60/042,725, filed on Apr. 8, 1997.

(51) Int. Cl.$^7$ .......................... C08G 72/20; C08L 83/07
(52) U.S. Cl. ................. 528/32; 525/326.5; 526/279; 528/14; 528/15; 528/19; 528/21; 528/23
(58) Field of Search ............... 526/279, 328, 526/329.2, 329.5; 528/15, 19, 23, 32; 525/326.5

(56) References Cited

U.S. PATENT DOCUMENTS

| 4,043,953 A | 8/1977 | Chang et al. |
| 4,056,559 A | 11/1977 | Lewis et al. |
| 4,499,150 A | 2/1985 | Dowbenko et al. |
| 4,499,151 A | 2/1985 | Dowbenko et al. |
| 4,707,515 A | 11/1987 | Gilch et al. |
| 5,153,268 A | 10/1992 | Legrow et al. |
| 5,264,530 A | 11/1993 | Darmon et al. |
| 5,710,227 A | 1/1998 | Freeman et al. |
| 5,739,238 A | 4/1998 | Petty et al. |

FOREIGN PATENT DOCUMENTS

| GB | 2 205 846 A | 12/1988 |

OTHER PUBLICATIONS

*Prog Polym. Sci.*, vol. 21, 1–45, 1996; "Photoacid and Photobase Generators: Chemistry and Applications to Polymeric Materials", Masamitsu Shirai and Masahiro Tsunooka.

*Polymer Preprints*, vol. 39, (2), 1998, "Catalytic Chain Transfer Polymerisation of Functional Methacrylates", A. G. Steward, D. M. Haddleton, A.V. G. Muir, S. L. Willis.

Primary Examiner—Fred Zitomer
(74) *Attorney, Agent, or Firm*—Ronald D. Bakule

(57) ABSTRACT

The present invention relates to a curable composition including an acryloxysilane- or acyloxysilane-containing oligomer prepared by a continuous process. In addition, photocurable composition including an alkoxysilane or acyloxysilane oligomer is provided. Methods are provided for curing the curable and photocurable compositions.

18 Claims, No Drawings

CURABLE COMPOSITION

This application is a continuation-in-part of U.S. application Ser. No. 09/212,038, filed on Dec. 15, 1998, which is a continuation-in-part of U.S. application Ser. No. 09/034,924, filed Mar. 5, 1998, now abandoned, which is a continuation of U.S. application Ser. No. 08/467,685, filed Jun. 5, 1995, now abandoned, which is a divisional of U.S. application Ser. No. 08/258,300, filed Jun. 13, 1994, now abandoned; a continuation-in-part of U.S. application Ser. No. 09/047,547, filed Mar. 25, 1998, which claims the benefit of U.S. Provisional No. 60/042,725, filed Apr. 8, 1997; and claims the benefit of U.S. Provisional No. 60/077,059, filed Mar. 6, 1998.

The present invention relates to curable compositions. In particular, this invention relates to a curable composition including an alkoxysilane containing oligomer and a catalyst, a second curable composition including an alkoxysilane containing oligomer and a photocatalyst, and methods of forming cured films.

Polymeric materials are used extensively as films and coatings to protect and to improve the appearance of substrates. To enhance the durability, toughness, and barrier properties of the films and coatings, the polymeric materials are often crosslinked, using a variety of cure chemistries. One such crosslinking chemistry is the condensation reaction of alkoxysilanes. Polymers with alkoxysilane groups, usually in the presence of catalyst, are reactive with moisture and can form crosslinked polymer films at ambient temperatures.

U.S. Pat. No. 4,499,150 teaches a method for coating substrates wherein the coating composition contains an addition interpolymer having alkoxysilane and/or acyloxysilane groups. The crosslinkable interpolymer is formed by the polymerization of alkoxysilane monomers and/or acyloxysilane monomers with other silicon-free monomers. The interpolymer is polymerized in an organic solvent by a batch process at 119° C. and uses initiators and chain transfer agents to achieve a desired molecular weight in the range of 2,000 to 20,000.

It is known in the art that high temperature processes are effective at producing low molecular oligomers from ethylenically unsaturated monomers. At high temperatures, depolymerization reactions and chain fragmentation processes compete with the polymerization reactions which grow the polymer chain length. For example, U.S. Pat. No. 5,710,227 teaches a high temperature polymerization of acrylic monomers above 150° C. by a continuous process to produce acrylic acid homo-oligomers and co-oligomers. One advantage of a high temperature process is the ability to eliminate the chain transfer agents which are often needed to control the molecular weight of the oligomers produced by lower temperature processes. Drawbacks to the use of chain transfer agents are that they add to the cost of the process, impart unneeded-functionality to the polymer, may introduce salts into the product, or necessitate a product separation step. Also, the mercaptan chain transfer agents commonly employed are not only expensive but require special handling since they are extremely odoriferous. A second advantage is that high temperature polymerization conditions can be readily adapted to a continuous process to obtain high production rates of oligomers.

A curable composition incorporating an oligomer containing alkoxysilane groups wherein the oligomer has been produced by a facile and economical process has long been sought.

In the present invention, a curable composition is provided including a alkoxysilane or acyloxysilane oligomer formed by a continuous reaction process at 150° C. to 500° C. The high temperature reaction continuous process produces alkoxysilane oligomers with degrees of polymerization ranging from 2 to 100 preferably without the use of chain transfer agents and with low levels of initiators. In an alternate embodiment of this invention, the alkoxysilane oligomer may be produced by the high temperature process without the use of solvents. A curable composition containing an alkoxysilane oligomer and a photoinitiator is also provided whereby the cure is initiated by exposure to actinic radiation.

In the first aspect of this invention, there is provided a curable composition including:
 (A) an oligomer prepared by a continuous process from one or more monomers selected from the group consisting of ethylenically unsaturated alkoxysilanes and acyloxysilanes, and optionally, one or more other ethylenically unsaturated monomers, wherein the monomers are polymerized at a temperature of 150° C. to 500° C., wherein the oligomer has a degree of polymerization from 2 to 100; and (B) a catalyst.

In a second aspect of the present invention, there is provided a method of forming a film incorporating the curable composition of the first aspect.

In the third aspect of the present invention, there is provided a curable composition comprising:
 (A) an oligomer comprising moieties selected from the group consisting of alkoxysilane and acyloxysilane moieties wherein the oligomer is prepared from the polymerization of ethylenically unsaturated monomers, wherein the oligomer has a degree of polymerization from 2 to 100; and
 (B) a photoinitiator.

In a fourth aspect of the present invention, there is provided a method of forming a film incorporating the curable composition of the third aspect.

As used herein, the term "acrylate" refers to esters of acrylic acid and the term "methacrylate" refers to esters of methacrylic acid. As used herein, the term "substantially free" means less than 0.5% by weight. As used herein, the term "oligomer" refers to a polymer prepared from ethylenically unsaturated monomers with a degree of polymerization in the range of 2 to 100.

The curable compositions of the present invention are believed to cure by covalent bond formation through reactions between the alkoxysilane containing oligomers. In the presence of a catalyst, the alkoxysilane groups can undergo condensation reactions leading to bond formation between oligomer chains and an increase in the molecular weight of the composition. The curing can be as simple as the formation of a single Si—O—Si between two different oligomer chains or can be as extensive as the formation of a network of Si—O—Si crosslinks throughout the curable composition.

The oligomer component of the curable composition is an alkoxysilane containing polymer. The oligomers are prepared by polymerizing ethylenically unsaturated alkoxysilane, acyloxysilane monomers or mixtures of these monomers to form oligomers or with other monomers to obtain co-oligomers. The choice of monomers is dependent on many factors including the intended end use of the curable composition, viscosity of the curable composition, and the monomer costs. Suitable alkoxysilane and acyloxysilane monomers include, for example, vinyl alkoxysilanes, allyl alkoxysilanes, acryloxyalkyl alkoxysilanes, methacryloxyalkyl alkoxysilanes, vinyl acyloxysilanes. Preferred vinyl alkoxysilane monomers are vinyl trialkoxysilanes, vinyl monoalkyldialkoxysilanes, and vinyl dialkyl-monoalkoxysilanes wherein the alkyl group contains 1 to 6 carbons and the alkoxy group contains 1 to 6 carbons.

Examples of preferred alkoxysilane and acyloxysilane monomers include vinyl trimethoxysilane, vinyl triethoxysilane, vinyl triisopropoxysilane, vinyl triacetoxysilane, vinyl methyldimethoxysilane, vinyl dimethylethoxysilane, allyl trimethoxysilane, 3-acryloxypropyl trimethoxysilane, 3-acryloxypropyl methyldimethoxysilane, methacryloxymethyl triethoxysilane, methacryloxypropyl methyldiethoxysilane, and methacryloxymethyl ris(trimethylsiloxy)silane.

Optional ethylenically unsaturated monomers suitable for copolymerization with the ethylenically unsaturated alkoxysilane and acetoxysilane monomers are esters of acrylates, esters of methacrylates, amides of acrylates, amides of methacrylates, vinyl aromatics, and vinyl esters of carboxylic acids. Examples of ethylenically unsaturated monomers include methyl acrylate, ethyl acrylate, butyl acrylate, hexyl acrylate, 2-ethylhexyl acrylate, lauryl acrylate, methyl methacrylate, butyl methacrylate, N,N-dimethylaminopropyl methacrylamide, vinyl acetate, and styrene. Preferred monomers are ethyl acrylate, butyl acrylate, 2-ethylhexyl acrylate, vinyl acetate, and methyl acrylate.

As used herein, the term "co-oligomer" is defined as an oligomer containing an alkoxysilane or acyloxysilane monomer and at least one other monomer. The monomer units of the co-oligomer may be arranged to form alternating, random, or block polymer structures. Oligomers formed from more than two different types of monomers, such as terpolymers or "ter-oligomers" are also contemplated. In the broadest sense, it is understood that in an oligomer with a degree of polymerization equal to N, the N monomer units can be independently selected such that it would be possible to form an oligomer with as many as N different monomers.

In a co-oligomer sample prepared from an alkoxysilane or acyloxysilane monomer and at least one other monomer, the compositions of the individual oligomer chains may contain various ratios of the two or more monomers including a small fraction of homo-oligomers formed from each of the monomers. The compositions of the oligomers reported herein are the average mole ratios of the individual monomer units contained within the oligomers of the curable composition.

The average compositional range of the oligomers of the curable composition can vary from oligomers composed only of alkoxysilane or acyloxysilane monomer or mixtures of the alkoxysilane and/or acyloxysilane monomers to co-oligomer composed of an average of 1 alkoxysilane or 1 acyloxysilane monomer unit per oligomer chain. A preferred composition range of alkoxysilane or acyloxysilane monomer to other monomer is 1:10 to 4:1 and a more preferred range is 1:6 to 2:1.

Various synthetic methods exist to prepare the oligomers of the curable composition including polymerization from ethylenically unsaturated alkoxysilane and acyloxysilane monomers or mixtures of these monomers with other ethylenically unsaturated monomers. Polymerization methods include anionic polymerization as disclosed in U.S. Pat. No. 4,056,559, radical polymerization in solution or bulk as described in U.S. Pat. No. 5,739,238, radical polymerization with chain transfer agents such as cobalt complexes as described in Polymer Preprints, 1998, Vol 39(2), pp. 459–460 by Steward et al., catalytic chain transfer polymerization with terminally unsaturated oligomers used as chain transfer agents as described in U.S. Pat. No. 5,264,530, high temperature radical polymerizations in batch, stirred tank, or tubular reactors. The polymerization processes can be batch, semicontinuous, or continuous processes. An alternate synthetic method to produce the oligomers of the curable composition is attaching alkoxysilane or acyloxysilane groups onto an existing oligomer as described in U.S. Pat. No. 4,707,515.

A preferred process to prepare the oligomers is continuous polymerization of the unsaturated alkoxysilane or acyloxysilane monomers with other monomers. The first step of this preferred process is forming a reaction mixture containing:

(a) from 0.5 to 99.95% by weight of the reaction mixture of one or more ethylenically unsaturated alkoxysilane and/or acyloxysilane monomer, and optionally, one or more other ethylenically unsaturated monomers;

(b) from 0.05 to 25% by weight, based on the weight of the ethylenically unsaturated monomer, of at least one free-radical initiator;

(c) from 0–99.5% solvent, based on the weight of the reaction mixture.

Preferably, the reaction mixture contains 10% to 99.95% by weight, and most preferably, 50% to 98% by weight, based on the weight of the reaction mixture, of at least one ethylenically unsaturated monomer. Preferably, the reaction mixture contains 0.1% to 5% by weight, and most preferably, 1% to 3% by weight, based on the weight of the ethylenically unsaturated monomer, of at least one free-radical initiator.

The preferred process is suitable for forming oligomers of the ethylenically unsaturated alkoxysilane and/or acyloxysilane monomers, and co-oligomers of the ethylenically unsaturated alkoxysilane and/or acyloxysilane monomers with the other ethylenically unsaturated monomers.

Initiators for carrying out the process of the present invention are any conventional free-radical initiators including, but not limited to, hydrogen peroxide, alkyl hydroperoxides, dialkyl peroxides, peresters, percarbonates, persulfates, peracids, oxygen, ketone peroxides, azo initiators and combinations thereof. Specific examples of some suitable initiators include hydrogen peroxide, oxygen, t-butyl hydroperoxide, di-tertiary butyl peroxide, tertiary-amyl hydroperoxide, methylethyl ketone peroxide, and combinations thereof.

The monomers may be polymerized as a dilute solution in solvent, although the preferred process does not require solvent, nor is the use of solvents preferred. The reaction mixture may contain one or more solvents at a level of from 0% to 99.5% by weight of the reaction mixture, preferably from 0% to 70% by weight of the mixture, and most preferably from 0% to 55% by weight of the reaction mixture. Suitable solvents for the preferred process are capable of dissolving the one or more monomers, especially under the supercritical fluid conditions of the process, and the oligomers formed therefrom. Suitable solvents for the present invention include, for example, ethers such as tetrahydrofuran, ketones such as acetone: esters such as ethyl acetate: alcohols such as methyl alcohol and butyl alcohol; alkanes such hexane and heptane; aromatic hydrocarbons such as benzene, toluene, and xylene; supercritical fluids such as carbon dioxide; and mixtures thereof. Supercritical fluids such as carbon dioxide are particularly useful because the solvent readily is stripped from the product and may be recycled. In the second step of the preferred process, the reaction mixture is continuously passed through a heated zone, wherein the reaction mixture is maintained at a temperature of at least 150° C. under elevated pressure. Once the reaction mixture is formed, it is preferable to have the passing reaction mixture reach the polymerization temperature as rapidly as possible. Preferably, the reaction mixture reaches the polymerization temperature within 2 minutes, more preferably within 1 minute, most preferably within 30 seconds. Prior to reaching the reaction temperature, the reaction mixture may be at any suitable temperature, preferably at a temperature of from 20° C. to 450° C., most preferably from a temperature of 20° C. to 60° C. The polymerization is conducted at a temperature of at least 150° C., and is preferably conducted at a temperature in the range of from 200° C. to 500° C., and most preferably at a temperature in the range of from 275° C. to 450° C.

The oligomerization at the elevated temperatures of the preferred process is rapid. Thus, the reaction mixture may be maintained at the polymerization temperature for as little as 0.1 seconds up to 4 minutes, preferably from 0.5 seconds to 2 minutes, most preferably from 1 second to 1 minute.

The elevated temperatures of the polymerization require that the polymerization reactor be equipped to operate at elevated pressures of at least 30 bars to maintain the contents of the reactor as a fluid at the reaction temperature. In general, it is preferred to conduct the polymerization at from 70 bars to 350 bars, and more preferably at from 200 bars to 300 bars.

In the preferred process to produce the oligomers of the present invention, the ethylenically unsaturated monomers, initiator, and, optionally, solvent are combined to form a reaction mixture. The order of combining the components of the reaction mixture is not critical to the process of the present invention. In one embodiment of the present preferred process, it may be desirable to use one or more solvents, heat the one or more solvents to an elevated temperature, and add the one or monomers and the at least one initiator to the heated solvent to form the reaction mixture. It is preferred to add the initiator last. The reaction mixture can be formed at a temperature below, at or above the polymerization temperature.

Reactors suitable to produce the oligomers of the present invention by the preferred process include tubular reactors having moving parts such as internal rotors or reactors having no moving parts. These reactors may have any cross-sectional shape that permit continuous, steady state flow and that may operate under elevated temperatures and pressures. Such reactors are typically made from inert materials, such as stainless steel or titanium. The reactor may be of any length and cross-sectional dimension that permits effective temperature and pressure control.

The preferred process to produce the oligomers of the present invention generally results in a conversion of the monomers into oligomer of from 10% to greater than 95% relative to the initial amount of the one or more monomers present in the reaction mixture. If residual monomer levels in the oligomer mixture are unacceptably high for a particular application, their levels can be reduced by any of several techniques known to those skilled in the art, including rotary or wiped film evaporation, distillation, and vacuum distillation. Preferably, any monomers which may be present in the oligomer are distilled or "stripped" and recycled for later use.

The preferred process to produce the oligomers included in the curable composition of the present invention results in oligomers having low molecular weights and narrow polydispersities. Furthermore, embodiments of the process result in products that do not require the removal of organic solvents (if none were used in the process) and are not contaminated with high levels of salt from initiator fragments, chain transfer agents, or other synthesis adjuvants. The preferred process may be used to produce oligomers having a degree of polymerization in the range of 2 to 100, preferably in the range of 3 to 50, and most preferably in the range of 4 to 25 wherein the degree of polymerization is the number of residues of the ethylenically unsaturated monomer units in an oligomer chain.

The consistency of the products ranges from a thin, water-like fluid to a viscous, taffy-like fluid. Furthermore, they do not require the use of solvents in the preparation or use and are substantially free of contaminants, including salts, surfactants, metals and the like.

Many catalysts are known to cure the alkoxysilane containing oligomers including organic acids such as p-toluenesulfonic acid, trifluoroacetic acid, methane sulfonic acid, trifluoromethane sulfonic acid, and n-butylphosphonic acid, inorganic acids such as phosphoric acid, metal salts of organic acids such as tin naphthenate, tin benzoate, tin octoate, tin butyrate, dibutyltin dilaurate, dibutyltin diacetate, iron stearate, and lead octoate, and organic bases such as isophorone diamine, methylene dianiline, and imidazole. "Catalysts" herein include salts which generate a catalyst upon the application of heat. Excluded from "catalysts" herein are photoacids and photobases which require exposure to radiation to generate the active acid or base form. A preferred catalyst is p-toluenesulfonic acid. The catalysts are added at various levels depending upon the intended use and method of application of the curable composition. A low level of catalyst is often chosen to provide sufficient time to allow wetting of the substrate and leveling of the curable composition prior to gelation of the composition. Effective catalyst levels are in the range of 0.01% to 10%, preferably in the range of 0.05% to 5%, and most preferably in the range of 0.1% to 1%, based on the weight of alkoxysilane and/or acyloxysilane containing material in the curable composition. The curable composition including inorganic pigment such as titanium dioxide may be require a higher catalyst level to effect cure than the curable composition without the inorganic pigment. The catalyst may be added as a neat material or diluted in a solvent.

The order of addition of the oligomer and the catalyst is not important. Typically, the smaller volume of catalyst is added to the larger volume of oligomer with sufficient mixing to provide a uniform concentration of catalyst in the curable composition. The curable composition including the oligomer and the catalyst is a stable mixture in the absence of moisture. Alternately, the oligomer and the catalyst can be stored separately and blended immediately prior to use.

The curable composition may optionally contain solvent. The solvent choice and level are typically based on many factors including compatibility with the other components of the curable composition, cost, volatility of the solvent, and desired application viscosity of the curable composition. Various solvents or solvent blends may be employed including alcohols such as methanol, ethanol, and isopropanol, aromatic hydrocarbons such as toluene, xylene, and naphtha, ether alcohols such as ethylene glycol monoethyl ether, ethylene glycol monobutyl ether, propylene glycol monomethyl ester, ketones such as methyl ethyl ketone, methyl isobutyl ketone, and esters such as butyl acetate. It is preferred that the oligomer of the curable composition is fully soluble in the solvent but the oligomer can also be provided as a dispersion. The solids levels of the oligomer of the curable composition may be in the range of 1% to 100%, preferably in a range of 20% to 100%, and most preferably in a range of 40% to 100%, based on the weight of the non-solvent components. In one embodiment, the curable composition may be provided at low viscosities without the addition of solvent wherein the viscosity of the curable coating is below 15 Pascal second, preferably below 5 Pascal second, and most preferably below 1 Pascal second, as measured by a Brookfield DV-I+ viscometer with the LV spindles at 20° C.

The curable compositions of the present invention may contain other ingredients including pigments, fillers, fibers, dyes, biocides including mildewcides and fungicides, plasticizers, humectants, adhesion promoters, surfactants, wetting agents, and flow adjuvants to modify the rheology and flow. Further, the curable compositions may be modified by the addition of other polymers including dispersion, emulsion, and solution polymers. These polymers can be nonreactive or may be functionalized with various reactive groups to provide a second means of curing the curable composition, for example, the reaction between alcohol groups and isocyanates to form urethane linkages.

Various techniques can be employed to apply the curable composition to substrates including spraying, dipping, brushing, curtain coating, and drawdown applicators.

The curable compositions of the present invention cure rapidly upon exposure to moisture or to exposure to temperatures greater than 70° C. in the absence of moisture. The moisture level is not critical to achieving cure although the cure rate is dependent upon the level of moisture in combination with other factors such as the thickness of the applied curable composition, the catalyst level, and the catalyst type. Suitable moisture levels are 1% or greater relative humidity at temperatures of 0° C. and higher, preferably 5% or greater relative humidity at temperatures of 0° C. and higher, and most preferably 10% or greater relative humidity at temperatures of 0° C. and higher. Moisture levels below 5% are sufficient to provide cure although the cure rate may be insufficient for many applications. The curable composition cures at ambient temperature as well as both higher and lower temperatures.

In another embodiment, photocurable compositions containing the alkoxysilane and/or acyloxysilane oligomers are prepared. The photocurable compositions include a photo-initiator which upon exposure to actinic radiation generates an acid or a base catalyst. The photoinitiators included in this invention are often referred to as photoacids or photobases and are chosen based on many factors including their photodissociation wavelength region, absorption strength, and cost. Preferred are photocatalysts which are soluble in the oligomer of the photocurable composition. Examples of photoacids and photobases are discussed in Progress in Polymer Science, 1996, Vol. 21, pp. 1–45 by Shirai and Tsunooka and include but are not limited to aryldiazonium salts, diarylhalonium salts, triarylsulfonium salts, nitrobenzyl esters, sulfones, O-acyloximes, and cobalt(III) amines. Blends of photoacid photoinitiators or blends of photobase initiators can be used to optimize the absorption region and the optical depth of the curable composition. The range of photoinitiator levels may be 0.1% to 20%, preferably 1% to 15%, and most preferably 2% to 10% photoinitiator weight based on weight of solids of the photocurable composition.

Cure is preferably effected by exposing the curable composition containing the photoinitiator to moisture during irradiation, after irradiation, or both. Effective moisture levels are similar to that discussed above.

The photocurable composition of this invention is irradiated with actinic radiation at various wavelengths. The optimum radiation wavelength region is determined by the absorption characteristics of the photoinitiator or blend of photoinitiators and is typically in the ultraviolet and visible wavelength region of 200 nm to 700 nm. The photocurable composition is stable when stored to minimize exposure to ambient light.

The photocurable composition can be prepared as described previously for the curable composition of the first aspect of this invention and can be applied by similar methods.

The curing composition and the photocurable composition of the present invention are useful in many applications including for example, protective films and coatings, barrier coatings, caulks, clear coats, sealants, automotive finishes, metal finishes, exterior coatings for concrete, masonry, and stone, binders for nonwoven fibers, adhesives, and surface treatments. Preferred surface treatments include sizing agents and coupling agents for hydroxyl functional surfaces such as glass, glass fibers, wood, aluminum and minerals such as talc, titanium dioxide, mica, wollostinite, silicates, and metal oxides.

The following examples are presented to illustrate the invention.

Oligomers were prepared by a continuous high temperature polymerization process. The polymerization reactor was a 3.05 meter (10 feet) long section of stainless steel tubing having a inner diameter of 1.6 mm ($1/16^{th}$ inch) and a wall thickness of 1.3 mm (0.050 inch) connected at one end to a high pressure pump (Hewlett Packard Model HP 1050 TI) and at another end to a back-pressure control device. Between the two ends, the section of tubing was coiled about a torus-shaped metal mandrel. The mandrel was situated above a primary coil of a transformer so that the coils of tubing and the mandrel functioned as secondary coils of the transformer. The coils of tubing were further equipped with one end of a temperature probe. The other end of the temperature probe was connected to a temperature controlling device. The temperature controlling device regulated the current supplied to the primary coil of the transformer which regulated the heat of inductance imparted to the coiled steel tubing.

A reaction mixture was prepared by mixing solvent (if present), ethylenically unsaturated silane monomers, other monomers (if present), and initiator. Nitrogen was bubbled through the mixture while stirring. Under solvent-free conditions, the initiator and monomer/comonomers were separately fed into the reactor.

Solvent was pumped through the tubing via the high pressure pump at a rate of from 0.05 to 10 milliliters per minute (ml/min). The pressure was maintained at a level of from 200 bars to 350 bars. Current was supplied to the primary coil of the transformer to increase the temperature within the tubing to the desired polymerization temperature. After about 15 minutes, the solvent being pumped through the tubing was replaced by the reaction mixture which was continuously pumped through the tubing at the same rate, temperature and pressure. After allowing the solvent to be cleared from the tubing, product was collected as the effluent from the back-pressure control device. When the addition of the reaction mixture was nearly complete, solvent was pumped through the tubing at the same rate, pressure, and temperature as the reaction mixture. Solvent and residual monomer was removed on a rotary evaporator or a wiped-film evaporator.

The composition and molecular weight of the oligomers can be determined by many conventional analytical techniques. In the examples below, the oligomers were characterized by infrared spectroscopy, GPC, and NMR. The mole ratio of the monomers in each oligomer was determined by proton NMR or by gas chromatography of the residual monomers in the unpurified oligomer sample. The number average molecular weight (Mn) and the weight average molecular weight (Mw) were determined by gel permeation chromatography (GPC) using appropriate molecular weight standards. The average oligomer formula was calculated from the Mn and the mole ratio of monomers in the oligomer. The polydispersity of the oligomer was calculated from the ratio of Mw to Mn. The degree of polymerization of an oligomer is the number of monomer units incorporated into the oligomer backbone and is calculated from the mole ratio of monomers in the oligomer and the Mn.

EXAMPLE 1

Preparation of Oligomer

A 1:1 molar ratio of ethyl acrylate monomer (EA) and vinyltrimethoxysilane (VTMO) were mixed with 2% di t-butylperoxide, based on monomer weight, to form the reaction mixture. The reaction mixture was fed into the continuous high temperature reactor and was heated to 300° C. at 241 bar with a flow of 5 ml/min. Residual monomer was removed using a rotary evaporator.

Average oligomer composition: 3.9EA/2.1VTMO

| | |
|---|---|
| Mw: | 1700 |
| Mn: | 700 |
| Polydispersity: | 2.4 |
| Viscosity: | 0.20 Pascal sec |

Average oligomer composition is reported as a mole ratio.

EXAMPLE 2

Preparation of Oligomer

A 2:1 molar ratio of ethyl acrylate monomer and VTMO were mixed with 2% di t-butylperoxide, based on monomer weight, to form the reaction mixture.

The reaction mixture was fed into the continuous high temperature reactor and was heated to 300° C. at 241 bar with a flow of 5 m/min. Residual monomer was removed using a rotary evaporator.

Average oligomer composition: 3EA/2VTMO

| | |
|---|---|
| Mw: | 1100 |
| Mn: | 590 |
| Polydispersity: | 1.9 |
| Viscosity: | 0.13 Pascal sec |

EXAMPLE 3

Preparation of Oligomer

A 1:1 molar ratio of butyl acrylate monomer (BA) and VTMO were mixed with 2% di t-butylperoxide, based on monomer weight, to form the reaction mixture. The reaction mixture was fed into the continuous high temperature reactor and was heated to 300° C. at 241 bar with a flow of 5 ml/min. Residual monomer was removed using a rotary evaporator.

Average oligomer composition: 4.3BA/2.4VTMO

| | |
|---|---|
| Mw: | 2100 |
| Mn: | 900 |
| Polydispersity: | 2.3 |
| Viscosity: | 0.19 Pascal sec |

EXAMPLE 4

Preparation of Oligomer

The oligomer was prepared by feeding a 50% weight solution in heptane of a 1:1 mole ratio of VTMO and styrene containing 2% di t-butyl peroxide, based on monomer weight, at 5 ml/min through the continuous high temperature reactor at a temperature of 300° C. and a pressure of 241 bar. Residual monomers and heptane solvent were removed from the oligomer product on a rotary evaporator.

Average oligomer composition: 3.4Styrene/0.5VTMO

| | |
|---|---|
| Mw: | 1500 |
| Mn: | 430 |
| Polydispersity: | 3.5 |
| Viscosity: | >80 Pascal sec |

EXAMPLE 5

Preparation of Oligomer

The oligomer was prepared by feeding a 50% weight solution in heptane of a 1:1 mole ratio of VTMO and vinyl acetate (VAc) containing 2% di t-butyl peroxide, based on monomer weight, at 5 ml/min through the continuous high temperature reactor at a temperature of 275° C. and a pressure of 241 bar. Residual monomers and heptane solvent were removed from the oligomer product on a rotary evaporator.

Average oligomer composition: 2.6VAc/3.1VTMO

| | |
|---|---|
| Mw: | 2300 |
| Mn: | 690 |
| Polydispersity: | 3.3 |
| Viscosity: | 0.31 Pascal sec |

EXAMPLE 6

Preparation of Oligomer

The oligomer was prepared by feeding a 50% weight solution in ethanol of a 2:1 mole ratio of ethyl acrylate and vinyltriethoxysilane (VTEO) containing 2% di t-butylperoxide, based on monomer weight, at 5 ml/min through the continuous high temperature reactor at a temperature of 300° C. and a pressure of 241 bar. Residual monomers and solvent were removed from the oligomer product on a rotary evaporator.

Average oligomer composition: 5.9EA/1.7VTEO

| | |
|---|---|
| Mw: | 2100 |
| Mn: | 920 |

-continued

| | |
|---|---|
| Polydispersity: | 2.3 |
| Viscosity: | 0.073 Pascal sec |

EXAMPLE 7

Preparation of Oligomer

The oligomer was prepared by feeding a 50% weight solution in methanol of a 2:1 mole ratio of ethyl acrylate and vinylmethyldimethoxysilane (VMDMO) containing 2% di t-butyl peroxide, based on monomer weight, at 5 ml/min through the continuous high temperature reactor at a temperature of 300° C. and a pressure of 241 bar. Residual monomers and solvent were removed from the oligomer product on a rotary evaporator.
Average oligomer composition:4.1EA/1.1VMDMO

| | |
|---|---|
| Mw: | 1020 |
| Mn: | 560 |
| Polydispersity: | 1.8 |
| Viscosity: | 0.13 Pascal sec |

EXAMPLE 8

Curable Composition and Comparative Example

Crystals of p-toluenesulfonic acid (pTSA) were dissolved in methanol to prepare a 10% solids catalyst solution. The catalyst solution was added with stirring to the neat oligomer and to a 50% oligomer solution in toluene to form curable compositions. Titanium tetraisopropoxide was added neat to the oligomer. Films were prepared by applying the curable compositions onto glass slides with a drawdown applicator (8-Path Wet Film Applicator, Paul N. Gardner Company). The curable compositions containing toluene were applied at a wet thickness of 0.127 mm (5 mil) which dried to a thickness of approximately 0.051 mm (2 mil). The curable compositions without toluene were applied at a wet thickness of 0.0508 mm (2 mil). The films were allowed to cure at ambient conditions for 30 minutes. Cure was evaluated by touching the film to determine if the sample was a solid. The strength of the cured film as characterized by resistance to marring was evaluated by striking the sample with a fingernail. The catalyst-containing curable compositions of this invention (Examples 8-1 to 8-5) cured to solid films in 30 minutes or less.

TABLE 8.1

Evaluation of Curable Composition and Comparative Composition

| Example | Oligomer | Concentration | Catalyst | Observations |
|---|---|---|---|---|
| 8-1 | Example 2 | 100% | 0.1% pTSA | cured to mar resistant film |
| 8-2 | Example 2 | 50% in toluene | 0.05% pTSA | cured to mar resistant film |
| 8-3 | Example 6 | 100% | 0.25% pTSA | cured mar resistant film |
| 8-4 | Example 7 | 100% | 0.25% pTSA | cured to soft tacky film |
| 8-5 | Example 2 | 60% in toluene | 2% Ti tetra-isopropoxide | cured to mar resistant film |
| Comparative A | Example 2 | 50% in toluene | none | remained as tacky liquid |

EXAMPLE 9

Effect of Catalyst Level

The oligomers were prepared as 50% solutions in toluene. The pTSA, a 10% solution in methanol, was added to the oligomer solutions with stirring to prepare the curable compositions. Films were prepared by applying the curable compositions onto glass slides with a drawdown applicator (8-Path Wet Film Applicator, Paul N. Gardner Company). The curable compositions were applied at a wet thickness of 0.127 mm (5 mil) which dried to a thickness of approximately 0.051 mm (2 mil). After 15 minutes of exposure at ambient conditions, the films were found to be resistant to marring by a striking fingernail.
The results in Table 9.1 show the curable compositions of this invention (Examples 9-1 to 9-12) cure with several levels of catalyst.

TABLE 9.1

Effect of pTSA level on cure

| Example | Oligomer | Catalyst Level | Mar Resistant? |
|---|---|---|---|
| 9-1 | Example 1 | 0.1% | Yes |
| 9-2 | Example 1 | 0.25% | Yes |
| 9-3 | Example 1 | 0.5% | Yes |
| 9-4 | Example 3 | 0.1% | Yes |
| 9-5 | Example 3 | 0.25% | Yes |
| 9-6 | Example 3 | 0.5% | Yes |
| 9-7 | Example 4 | 0.1% | Yes |
| 9-8 | Example 4 | 0.25% | Yes |
| 9-9 | Example 4 | 0.5% | Yes |
| 9-10 | Example 5 | 0.1% | Yes |
| 9-11 | Example 5 | 0.25% | Yes |
| 9-12 | Example 5 | 0.5% | Yes |

EXAMPLE 10

Pigmented Curable Composition

A pigmented curable composition was prepared by adding 25 g of Ti-Pure(D (E.I. du Pont de Nemours & Co.) R-706 titanium dioxide and 25 g of the oligomer of Example 1 to a 118ml (¼ pint) shot mill containing 50 g of ziconia beads and shaking the mixture for 10 minutes on a paint shaker. A solution of 10% pTSA in methanol as a catalyst to the mixture of oligomer and pigment. A 0.102 mm (4 mil) wet thickness film was applied with a drawdown blade onto an aluminum panel.

TABLE 10.1

Effect of Catalyst Level on Cure of Pigmented Curable Composition.

| | Catalyst | Observation |
|---|---|---|
| Comparative B | none | remained liquid after 3 days |
| Example 10-1 | 0.1% pTSA | remained liquid after 3 days |
| Example 10-2 | 1.0% pTSA | cured to solid film in 10 minutes |

Catalyst level was weight % catalyst based on weight of oligomer. The results in Table 10.1 show that the titanium oxide pigmented curable compositions required a higher level of pTSA catalyst to effect cure in less than 1 hour than the unpigmented curable compositions in Examples 9-1 to 9-3. The pTSA catalyst is believed to be deactivated on the surface of the titanium oxide pigment.

EXAMPLE 11

Cure by Sol Gel Process

The oligomers were weighed into Teflon® (E.I. du Pont de Nemours & Co.) beakers. First, deionized water was added to the oligomer and mixed. Next, the pH was adjusted by the addition of 0.01N HCl. Finally, ethanol was added to the oligomer mixture. The beaker was covered to prevent evaporation of the solvents. After two days, the beaker was uncovered and the solvents evaporated to yield a hard rubber-like discs with a clear uniform appearance.

TABLE 11.1

Ingredients Used in Sol Gel Preparation

|  | Example 11-1 | Example 11-2 |
|---|---|---|
| Oligomer: | | |
| Example 1 | 17.54 g | |
| Example 2 | | 18.76 g |
| deionized water | 1.85 g | 1.81 g |
| 0.01N HCl | 0.505 g | 0.508 g |
| ethanol | 3.94 g | 3.94 g |

The disc was approximately 3 cm in diameter by 1 cm thick indicating that Examples 11-1 and 11-2 of this invention cured.

EXAMPLE 12

Photocurable Composition

The photocurable compositions were prepared by mixing the oligomer of Example 1 with photoinitiators. The 0.051 mm (2 mil) thick coating of the photocurable composition was applied onto glass slides with a drawdown applicator (8-Path Wet Film Applicator, Paul N. Gardner Company) and irradiated by passing the coated substrate through a UV processor (PPG QC 1202 UV Processor). After exposure to a radiation dosage of 4 Watts/cm$^2$, the coatings were initially cured only on the top but subsequently cured to clear, mar resistant films in 3 minutes.

TABLE 12.1.1

Effect of Photoinitiator Type on Photocure of Example 1 Oligomer

|  | Photoinitiator | Result |
|---|---|---|
| Example 12-1 | 5% SarCat ® CD1010 | mar resistant film |
| Example 12-2 | 5% SarCat ® CD1011 | mar resistant film |
| Comparative C | 5% benzophenone | liquid |
| Comparative D | none | liquid |

SarCat ® CD1010 (Sartomer): triaryl sulfonium hexafluoroantinonate
SarCat ® CD1011 (Sartomer): triaryl sulfonium hexafluorphosphate Irradiation of the photocurable compositions Examples 12-1 and 12-2 of this invention containing the photoacids exhibited good cure. Irradiation of the sample without photoinitiator (Comparative D) and with the radical generating benzophenone photoinitiator (Comparative C) remained liquids after UV exposure indicating that cure to provide a film did not occur under these conditions.

What is claimed is:

1. A curable composition comprising:
   (A) an oligomer prepared by a continuous process from one or more monomers selected from the group consisting of ethylenically unsaturated alkoxysilane and acyloxysilane monomers, and optionally, one or more other ethylenically unsaturated monomers, wherein said monomers are polymerized at a temperature of 150° C. to 500° C., wherein said oligomer has a degree of polymerization from 2 to 100; and
   (B) a catalyst.

2. The curable composition of claim 1 wherein said oligomer is polymerized from vinyl trimethoxysilane monomer and a second monomer selected from the group consisting of ethyl acrylate, butyl acrylate, 2-ethylhexyl acrylate, styrene, and vinyl acetate.

3. The curable composition of claim 1 wherein said oligomer has a mole ratio in the range of 1:10 to 4:1 of polymerized ethylenically unsaturated alkoxysilane and acyloxysilane monomers to polymerized other ethylenically unsaturated monomers.

4. A method of forming a film by:
   (A) applying onto a substrate a curable composition comprising: (i) an oligomer prepared by a continuous process from one or more monomers selected from the group consisting of ethylenically unsaturated alkoxysilane and acyloxysilane monomers, and optionally, one or more other ethylenically unsaturated monomers, wherein said monomers are polymerized at a temperature of 150° C. to 500° C., wherein said oligomer has a degree of polymerization from 2 to 100, and (ii) a catalyst; and
   (B) curing said composition.

5. A product produced by the method of claim 4.

6. A photocurable composition comprising:
   (A) an oligomer comprising moieties selected from the group consisting of alkoxysilane and acyloxysilane moieties wherein said oligomer is prepared from the polymerization of ethylenically unsaturated monomers, wherein said oligomer has a degree of polymerization from 2 to 100; and
   (B) a photoinitiator selected from the group consisting of photoacids and photobases.

7. The composition of claim 6 wherein said oligomer is prepared by a continuous process from one or more monomers selected from the group consisting of ethylenically unsaturated alkoxysilane and acyloxysilane monomers, and optionally, one or more other ethylenically unsaturated monomers, wherein said monomers are polymerized at a temperature of 150° C. to 500° C., wherein said oligomer has a degree of polymerization from 2 to 100.

8. A method of forming a film by:
   (A) applying a photocurable composition comprising: (i) an oligomer comprising moieties selected from the group consisting of alkoxysilane and acyloxysilane moieties wherein said oligomer is prepared from the polymerization of ethylenically unsaturated monomers, wherein said oligomer has a degree of polymerization from 2 to 100, and (ii) a photoinitiator selected from the group consisting of photoacids and photobases;
   (B) exposing said photocurable composition to actinic radiation; and
   (C) curing said composition.

9. The method of claim 8 wherein said oligomer is prepared by a continuous process from one or more monomers selected from the group consisting of ethylenically unsaturated alkoxysilane and acyloxysilane monomers, and optionally, one or more other ethylenically unsaturated monomers, wherein said monomers are polymerized at a temperature of 150° C. to 500° C., wherein said oligomer has a degree of polymerization from 2 to 100.

10. A product produced by the method of claim 8.

11. The curable composition of claim 1 wherein said temperature is in the range of 150° C. to 450° C.

12. The curable composition of claim 1 wherein said catalyst is selected from the group consisting of p-toluenesulfonic acid, trifluoroacetic acid, methane sulfonic acid, trifluoromethane sulfonic acid, n-butylphosphonic acid, phosphoric acid, tin naphthenate, tin benzoate, tin octoate, tin butyrate, dibutyltin dilaurate, dibutyltin diacetate, iron stearate, lead octoate, isophorone diamine, methylene dianiline, and imidazole.

13. The method of claim 4 wherein said temperature is in the range of 150° C. to 450° C.

14. The method of claim 4 wherein said catalyst is selected from the group consisting of p-toluenesulfonic acid, trifluoroacetic acid, methane sulfonic acid, trifluoromethane sulfonic acid, n-butylphosphonic acid, phosphoric acid, tin naphthenate, tin benzoate, tin octoate, tin butyrate, dibutyltin dilaurate, dibutyltin diacetate, iron stearate, lead octoate, isophorone diamine, methylene dianiline, and imidazole.

15. The product of claim 5 wherein said temperature is in the range of 150° C. to 450° C.

16. The product of claim 5 wherein said catalyst is selected from the group consisting of p-toluenesulfonic acid, trifluoroacetic acid, methane sulfonic acid, trifluoromethane sulfonic acid, n-butylphosphonic acid, phosphoric acid, tin naphthenate, tin benzoate, tin octoate, tin butyrate, dibutyltin dilaurate, dibutyltin diacetate, iron stearate, lead octoate, isophorone diamine, methylene dianiline, and imidazole.

17. The composition of claim 7 wherein said temperature is in the range of 150° C. to 450° C.

18. The method of claim 9 wherein said temperature is in the range of 150° C. to 450° C.

\* \* \* \* \*